United States Patent [19]

Smith

[11] 4,039,451
[45] Aug. 2, 1977

[54] EVAPORATION OF TREATED WASTE WATER

[76] Inventor: Alvin Jack Smith, 228 Cordova Drive, Santa Barbara, Calif. 93110

[21] Appl. No.: 605,594

[22] Filed: Aug. 18, 1975

[51] Int. Cl.² ........................................... B01D 23/16
[52] U.S. Cl. ................................. 210/170; 210/197; 210/265; 210/532 S
[58] Field of Search ...................... 210/532 S, 65, 170, 210/17, 150, 151, 248, 268, 286, 288, 290, 265, 197, 291, 293; 61/10–13

[56] References Cited

U.S. PATENT DOCUMENTS

| 681,884 | 9/1901 | Monjeau | 210/17 |
|---|---|---|---|
| 789,595 | 5/1905 | Duncan et al. | 210/290 X |
| 1,975,638 | 10/1934 | Girard | 210/151 |
| 2,308,866 | 1/1943 | Dekema | 210/17 X |
| 3,306,447 | 2/1967 | Medeiros | 210/170 X |
| 3,307,360 | 3/1967 | Bailly | 61/11 |
| 3,615,019 | 10/1971 | Early, Jr. | 210/293 |
| 3,681,236 | 8/1972 | Bergles et al. | 210/532 S X |

Primary Examiner—Frank W. Lutter
Assistant Examiner—William A. Cuchlinski, Jr.
Attorney, Agent, or Firm—William W. Haefliger

[57] ABSTRACT

A waste water evaporation system includes an elongated evaporation bed having an upper layer of rock pieces and a lower sand layer. A perforated pipe extends in the rock layer to slowly deliver waste water for percolation into the sand layer; and a lower layer of rock pieces under the sand layer may receive drainage of excess water for recirculation to the top layer via a sump and pump.

6 Claims, 5 Drawing Figures

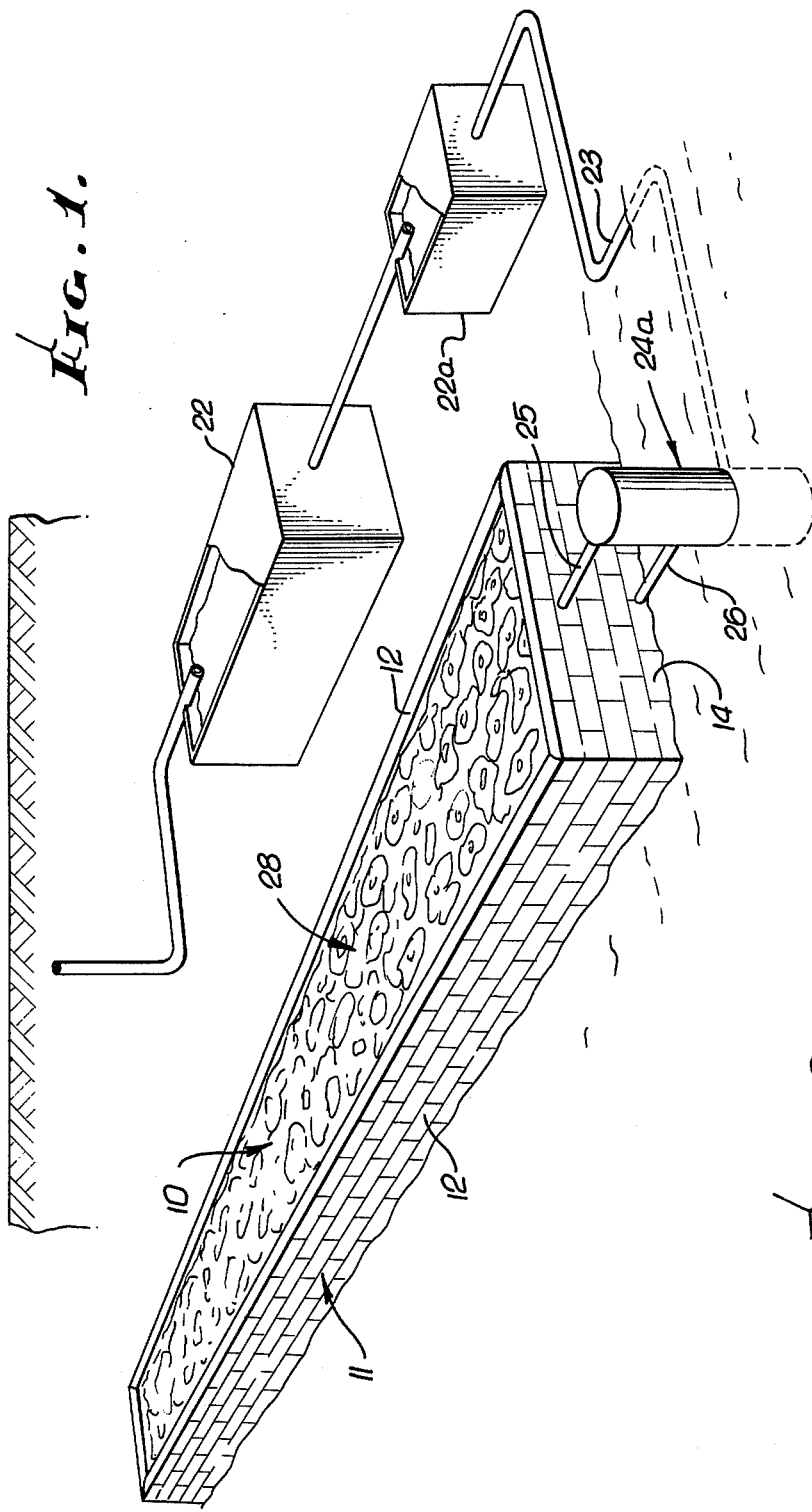
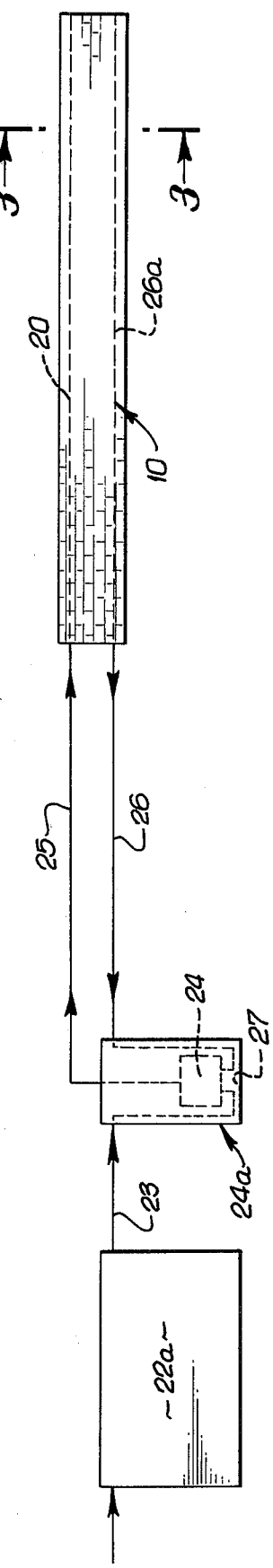

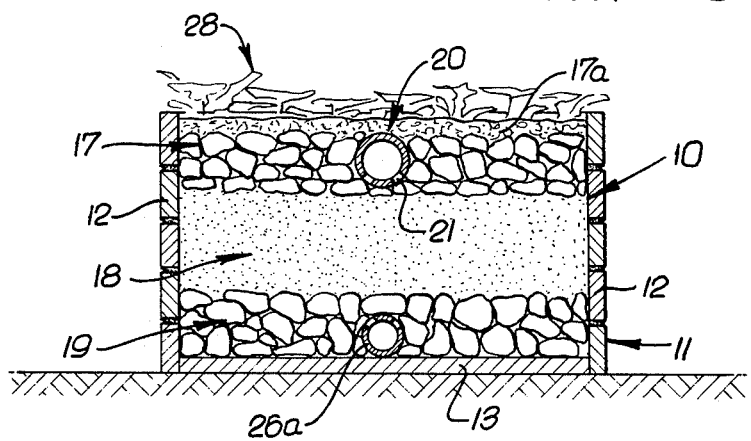
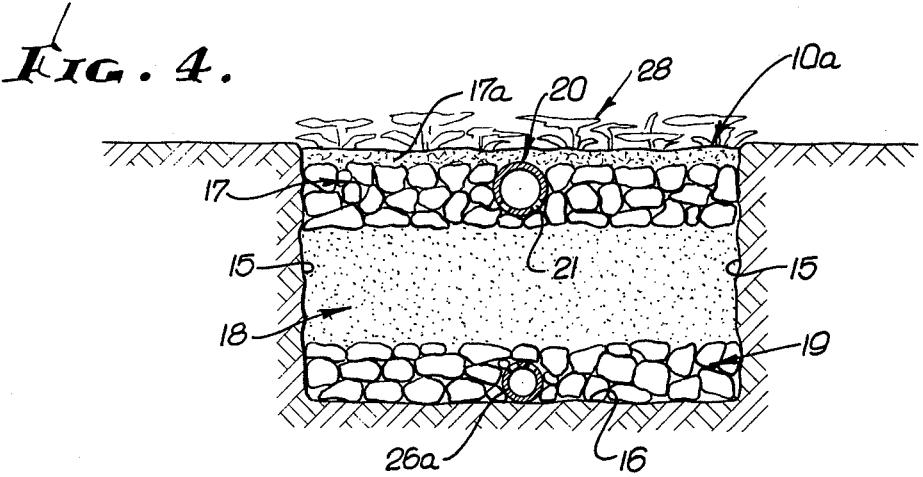
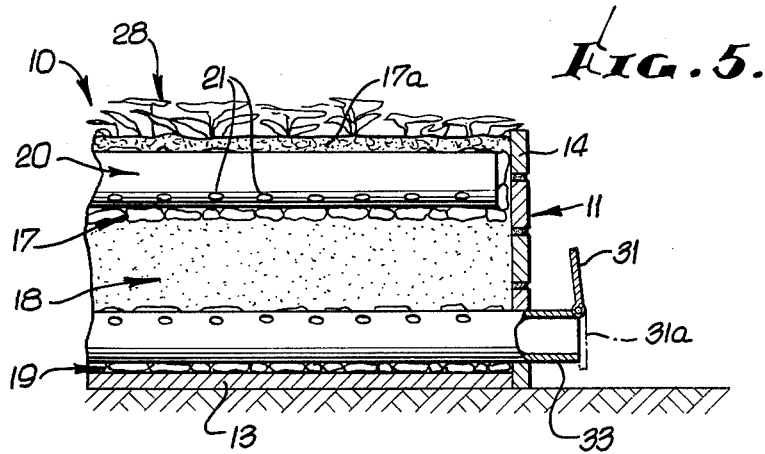

EVAPORATION OF TREATED WASTE WATER

BACKGROUND OF THE INVENTION

This invention relates generally to evaporation of treated waste water; more particularly it concerns method and apparatus for achieving high rates of evaporation of such water by employment of specially selected media.

Evaporation of waste water distributed as by leach lines from homes and small parks is relatively slow. Theoretically, capillarity action gives soil its capacity to evaporate as the soil particles pushed together. There is a pathway for water to come up through the soil to evaporate. Most natural soil contains clay and slit. These two combined make it difficult for the water to come up through soil to evaporate. For the best results, all soil particles should be the same size and when compacted should be arranged in a rhomoid shape, but such soils are normally not present. As a result, conventional leach lines tend to clog or overflow.

SUMMARY OF THE INVENTION

It is a major object of the invention to overcome the above described problems and difficulties through the provision of a combination of soils that will give 20 to 30 times evaporation rates that are obtainable in nature. Temperature, humidity and wind all play a part in evaporation. If we select the proper materials, properly combined and compacted, then feed water into the media at a certain rate per hour we can realize the accelerated rate of evaporation.

Basically, the waste water evaporation system comprises:

a. a generally horizontally elongated evaporation bed comprising multiple layers, the top layer exposed to the atmosphere, b. said layers including an upper layer of rock pieces and a lower sand layer, c. there being piping extending in the upper rock layer and containing perforations to relatively slowly deliver waste water into that rock layer for percolation into the sand layer and ultimate evaporation therefrom.

As will appear, a lower rock layer may be provided under the sand layer to receive drainage of excess water, and means may be provided to recirculate the drainage water for return to the top rock layer. Also, the bed may be above ground or below ground; the sand is preferably compacted for best results; the lower rock layer is preferably aerated to prevent its becoming septic; and waste water flow rates to the bed should be kept below 0.2 gallons per square foot per each two hour period.

These and other objects and advantages of the invention, as well as the details of an illustrative embodiment, will be more fully understood from the following description and drawings, in which:

DRAWING DESCRIPTION

FIG. 1 is a perspective showing of a system embodying the invention;

FIG. 2 is an elevation schematically illustrating the invention;

FIG. 3 is an enlarged section on lines 3—3 of FIG. 2;

FIG. 4 is a view like FIG. 3, showing an alternative form; and

FIG. 5 is a fragmentary side elevation showing an air valve incorporated by the invention.

DETAILED DESCRIPTION

In FIGS. 1-3 and 5, a generally horizontally and lengthwise elongated evaporation bed 10 is enclosed within an open top above-ground box 11 having side, bottom and end walls 12-14. In FIG. 4 the bed 10a is contained within an elongated below-ground trench having side and bottom walls 15-16; however, the bed 10a is the same as 10.

The bed includes multiple layers including a top layer 17 of crushed rock or rock pieces the top surface of which may be covered by a layer 17a of top soil or mulch exposed to the atmosphere. Extending below the rock layer is a layer 18 of compacted sand, and below that a second or lower rock layer 19. Piping such as lengthwise elongated pipe 20 extends within the upper rock layer and contains perforations 21 to relatively slowly deliver waste water into that layer for percolation into the sand layer 18 and ultimate evaporation via layers 18 and 17. Means to deliver waste water to the pipe 20 includes an aerated underground septic tank 22 or tanks 22 and 22a, delivery pipe 23, a pump 24 in pump basin 24a, and inlet pipe 25. Tanks 22 and 22a may be as described in my co-pending application Ser. No. 495,053, entitled Aerated Sewerage Disposal.

Excess water, if any, drains from the sand layer into the lower rock layer, and means is provided to recirculate such excess back to pipe 20. In this regard, the excess slowly flows from the lower rock layer to an outlet line 26 and to the sump 27 in pump basin 24a. Line 26 may be fed from an extension drain pipe 26a (perforated) within layer 19. Pump 24 than operates, intermittently, to circulate both recirculated water and make-up water from line 23 to the pipe 20 for distribution to the bed. For best results, the rate of water distribution to the bed should be between 0.1 and 0.2 gallons per square foot of bed horizontal area, per each 2 hour period, 12 times a day. Either continuous or intermittent flow can be employed.

When too much water is introduced through the perforated pipe, the filter media will let the water pass through and act as a filter instead of an accelerated evaporation unit. The water will run out the bottom drain and return to the pump for return to the bed at the next pumping cycle. In the winter months, this happens when it rains. The bed, when properly constructed, will recover in several days. Under normal rain conditions, the bed will operate with no trouble. When temperature and humidity are low and wind is not blowing, there is very little evaporation in the accelerated evaporation bed. In nature, however, there is no evaporation under these conditions.

The water evaporated will be free of bacteria and virus. Flowers 28 can be planted in mulch or soil layer 17a to aid the evaporation through transpiration. The flowers or plants grow rapidly in this type of conditon.

Engineering test which have been conducted, show that as much as 4 gallons per sqaure foot of bed area can be evaporated with this method in 24 hours. In nature, under the same conditions, about 0.2 gallons per square foot area occurs in 24 hours.

The filter media or layer 18 consists of sand with a certain gradation and that is very clean. Sand equivalent must be more than 85% pure sand. Sand sizes to be used are as follows, with reference to a Tyler screen:

| size | | % passage | |
|---|---|---|---|
| 3/8 | screen | 100 | |
| No. 4 | screen | 100 | |
| No. 8 | screen | 91 | (can vary 1%) |
| No. 10 | screen | 73 | (can vary 1%) |
| No. 30 | screen | 51 | (can vary 2%) |
| No. 50 | screen | 28 | (can vary 3%) |
| No. 100 | screen | 8 | (can be as high as 10) |
| No. 200 | screen | 3 | (can be as high as 8) |

The sand must be compacted with natural moisture only to a minimum density of 80 to 90 pounds per cubic foot, the sand having a specific gravity of about 2.60. The rock layers typically consist of No. 5, ⅜ inch rock pieces.

The vertical dimension of the layers are as follows:

| layer 17a: | between | 2 | and | 4 | inches |
|---|---|---|---|---|---|
| layer 17: | between | 3 | and | 4 | inches |
| layer 18: | between | 4 | and | 5 | inches |
| layer 19: | between | 7 | and | 9 | inches |

FIG. 5 shows the provision of an air vent or valve 31 at the end (or side) of the tank and at the level of the lower rock layer 19 to aerate the latter. This maintains flow of air beneath the sand layer, for oxidation of bacteria, to prevent the sand layer from turning septic. Closed position of the valve is indicated at 31a, against the end of pipe 33 which may extend into the layer 18 and may be perforated.

Waste water flows from tank 22a to sump 24a by gravity.

I claim:

1. In a system for evaporating waste water,
   a. a generally horizontally elongated evaporation bed comprising multiple layers, the top layer exposed to the atmosphere,
   b. said layers including an upper layer of rock pieces and a lower sand layer,
   c. there being piping extending in the upper rock layer and containing perforations to relatively slowly deliver waste water into that rock layer for percolation into the sand layer and ultimate evaporation therefrom,
   d. there being a lower rock layer under the sand layer to receive drainage of excess water therefrom, and means to recirculate drainage of water in the lower rock layer for return to the upper rock layer, said last named means including a sump in communication with said lower rock layer to receive water drainage therefrom, and a pump taking suction from the sump and having its outlet in supply communication with said piping, and
   e. a septic tank, and a conduit communicating between said tank and said pump to deliver tank contents to the sump for delivery by the pump to said piping in the upper rock layer.

2. The system of claim 1 wherein said bed is above ground and including an open top container in which said bed is received.

3. The system of claim 1 wherein said bed is below ground and received in a trench.

4. The system of claim 1 including an air passing vent in communicating with said lower rock layer.

5. The system of claim 1 wherein said sand layer is compacted to a minimum density of 80 to 90 pounds per cubic foot.

6. The system of claim 1 includng a layer of mulch or soil overlying the upper layer of rock pieces for growing plants.

* * * * *